(12) United States Patent
Wang et al.

(10) Patent No.: US 8,516,163 B2
(45) Date of Patent: Aug. 20, 2013

(54) HARDWARE-BASED CONCURRENT DIRECT MEMORY ACCESS (DMA) ENGINES ON SERIAL RAPID INPUT/OUTPUT SRIO INTERFACE

(75) Inventors: Chi-Lie Wang, Milpitas, CA (US); Bertan Tezcan, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1254 days.

(21) Appl. No.: 11/679,820

(22) Filed: Feb. 27, 2007

(65) Prior Publication Data
US 2008/0209084 A1 Aug. 28, 2008

(51) Int. Cl.
*G06F 13/28* (2006.01)
*G06F 9/26* (2006.01)

(52) U.S. Cl.
USPC ............................................ 710/22; 711/203

(58) Field of Classification Search
None
See application file for complete search history.

(56) References Cited

U.S. PATENT DOCUMENTS

| | | | |
|---|---|---|---|
| 4,090,238 A | 5/1978 | Russo | |
| 4,438,489 A | 3/1984 | Heinrich et al. | |
| 4,768,149 A | 8/1988 | Konopik et al. | |
| 5,202,964 A | 4/1993 | Crouch | |
| 5,530,902 A * | 6/1996 | McRoberts et al. | 710/28 |
| 5,578,953 A | 11/1996 | Nuckols | |
| 5,608,873 A | 3/1997 | Feemster et al. | |
| 5,737,547 A | 4/1998 | Zuravleff et al. | |
| 5,905,913 A | 5/1999 | Garrett et al. | |
| 5,991,817 A * | 11/1999 | Rowett et al. | 709/250 |
| 6,070,219 A | 5/2000 | McAlpine et al. | |
| 6,145,007 A | 11/2000 | Dokic et al. | |
| 6,189,049 B1 | 2/2001 | Klein | |
| 6,222,846 B1 | 4/2001 | Bonola et al. | |
| 6,393,507 B2 | 5/2002 | Klein | |
| 6,546,482 B1 | 4/2003 | Magro et al. | |
| 6,665,872 B1 | 12/2003 | Krishnamurthy et al. | |
| 6,954,811 B2 | 10/2005 | Vishnu | |
| 7,154,902 B1 | 12/2006 | Sikdar | |
| 7,353,360 B1 * | 4/2008 | Muller et al. | 711/203 |
| 7,395,362 B2 | 7/2008 | Drexler et al. | |
| 7,433,985 B2 | 10/2008 | Ayyar et al. | |
| 7,548,586 B1 | 6/2009 | Mimar | |
| 7,701,949 B1 | 4/2010 | Rose et al. | |
| 7,870,313 B2 | 1/2011 | Wang et al. | |
| 2003/0061431 A1 * | 3/2003 | Mears et al. | 710/305 |
| 2003/0097460 A1 | 5/2003 | Yigashiyama et al. | |

(Continued)

FOREIGN PATENT DOCUMENTS

DE    101 55 486 A1    5/2003

*Primary Examiner* — Hyun Nam
(74) *Attorney, Agent, or Firm* — Bever, Hoffman & Harms LLP

(57) ABSTRACT

A serial buffer includes queues configured to store data packets received from a host. A direct memory access (DMA) engine receives data packets from the highest priority queue having a water level that reaches a corresponding watermark. The DMA engine is configured in response to a DMA register set, which is selected from a plurality of DMA register sets. The DMA register set used to configure the DMA engine can be selected in response to information in the header of the read data packet, or in response to the queue from which the data packet is read. Each DMA register set defines a corresponding buffer in system memory, to which the data packet is transferred. Each DMA register set also defines whether the corresponding buffer is accessed in a wrap mode or a stop mode, and whether doorbell signals are generated in response to transfers to the last address in the corresponding buffer.

14 Claims, 7 Drawing Sheets

(56) References Cited

U.S. PATENT DOCUMENTS

| | | |
|---|---|---|
| 2004/0123175 A1 | 6/2004 | Roth et al. |
| 2005/0015529 A1 | 1/2005 | Jung et al. |
| 2005/0138246 A1 | 6/2005 | Chen et al. |
| 2005/0273540 A1 | 12/2005 | Whaley |
| 2006/0168384 A1 | 7/2006 | Radhakrishnan et al. |
| 2007/0162642 A1* | 7/2007 | Tousek .......................... 710/22 |
| 2010/0014440 A1 | 1/2010 | Yazaki et al. |

* cited by examiner

HARDWARE-BASED CONCURRENT DIRECT MEMORY ACCESS (DMA) ENGINES ON SERIAL RAPID INPUT/OUTPUT SRIO INTERFACE

RELATED APPLICATIONS

The present application is related to the following commonly-owned, co-filed U.S. patent applications, which are hereby incorporated by reference in their entirety:

U.S. patent application Ser. No. 11/679,813 "PACKET-BASED PARALLEL INTERFACE PROTOCOL FOR A SERIAL BUFFER HAVING A PARALLEL PROCESSOR PORT", by Jason Z. Mo and Stanley Hronik U.S. patent application Ser. No. 11/679,817 "METHOD AND STRUCTURE TO SUPPORT SYSTEM RESOURCE ACCESS OF A SERIAL DEVICE IMPLEMENTING A LITE-WEIGHT PROTOCOL", by Chi-Lie Wang, Jason Z. Mo and Calvin Nguyen.

U.S. patent application Ser. No. 11/679,823 "RAPID INPUT/OUTPUT DOORBELL COALESCING TO MINIMIZE CPU UTILIZATION AND REDUCE SYSTEM INTERRUPT LATENCY", by Chi-Lie Wang, Kwong Hou ("Ricky") Mak and Jason Z. Mo.

U.S. patent application Ser. No. 11/679,824 "MULTI-BUS STRUCTURE FOR OPTIMIZING SYSTEM PERFORMANCE OF A SERIAL BUFFER", by Steve Juan, Chi-Lie Wang and Ming-Shiung Chen.

BACKGROUND OF THE INVENTION

1. Field of the Invention

The present invention relates to an improved method and structure for configuring DMA engines to implement DMA transfers from a serial buffer to a system memory on a serial interface.

2. Related Art

Serial buffers have been used to transfer data between host processor and a system memory. These serial buffers typically use descriptor structures, such as a descriptor buffer list, to specify the destination of data transfers in the system memory. The descriptor buffer list can be based on either a ring buffer or a link list, which requires software to set up (enqueue) and tear down (dequeue). Consequently, performing buffer management using the descriptor buffer list undesirably consumes processing power of the host processor.

A dedicated DMA engine is typically used to implement data transfers between a queue/buffer of the serial buffer and the system memory. When multiple DMA engines have been used, only one DMA engine is active at any given time to transfer data from a specific queue/buffer of the serial buffer. Using multiple DMA engines in this manner is inefficient.

It would therefore be desirable to have an improved method for offloading data from a serial buffer, which overcomes the above described deficiencies of conventional serial buffers.

SUMMARY

Accordingly, the present invention provides a serial buffer having a serial rapid input/output (sRIO) interface, and improved data offload functions. In accordance with one embodiment, data packets are loaded into the serial buffer as temporary storage. After a programming interval has been reached, the stored data packets are unloaded from the serial buffer into a system memory via a sRIO bus. This transfer is implemented by a DMA engine, which is configured in response to parameters stored in a selected DMA register set.

The selected DMA register set is chosen from a plurality of DMA register sets. The DMA register set used to configure the DMA engine is selected to provide efficient bus master DMA operations with minimum host interaction. Each DMA register set defines a corresponding system buffer in the system memory. After the system buffers have been defined, these system buffers can be dynamically re-used after all of the system buffer space has been consumed.

The DMA register sets used to configure the DMA engine can be selected in a queue-based manner or a packet-based manner. For queue-based DMA channel selection, each queue is assigned a corresponding DMA register set with a pre-assigned priority. For packet-based DMA channel selection, a DMA register set is selected in response to information contained in the header of the data packet read from a queue. Packet-based DMA channel selection allows packets being stored in the same queue to be unloaded through DMA engines configured using different DMA register sets, and into different system buffer space. This packet-based method also allows packets provided from different sources to be stored in the same queue, and then sent to their destination.

The present invention will be more fully understood in view of the following description and drawings.

DETAILED DESCRIPTION

Figure 1:
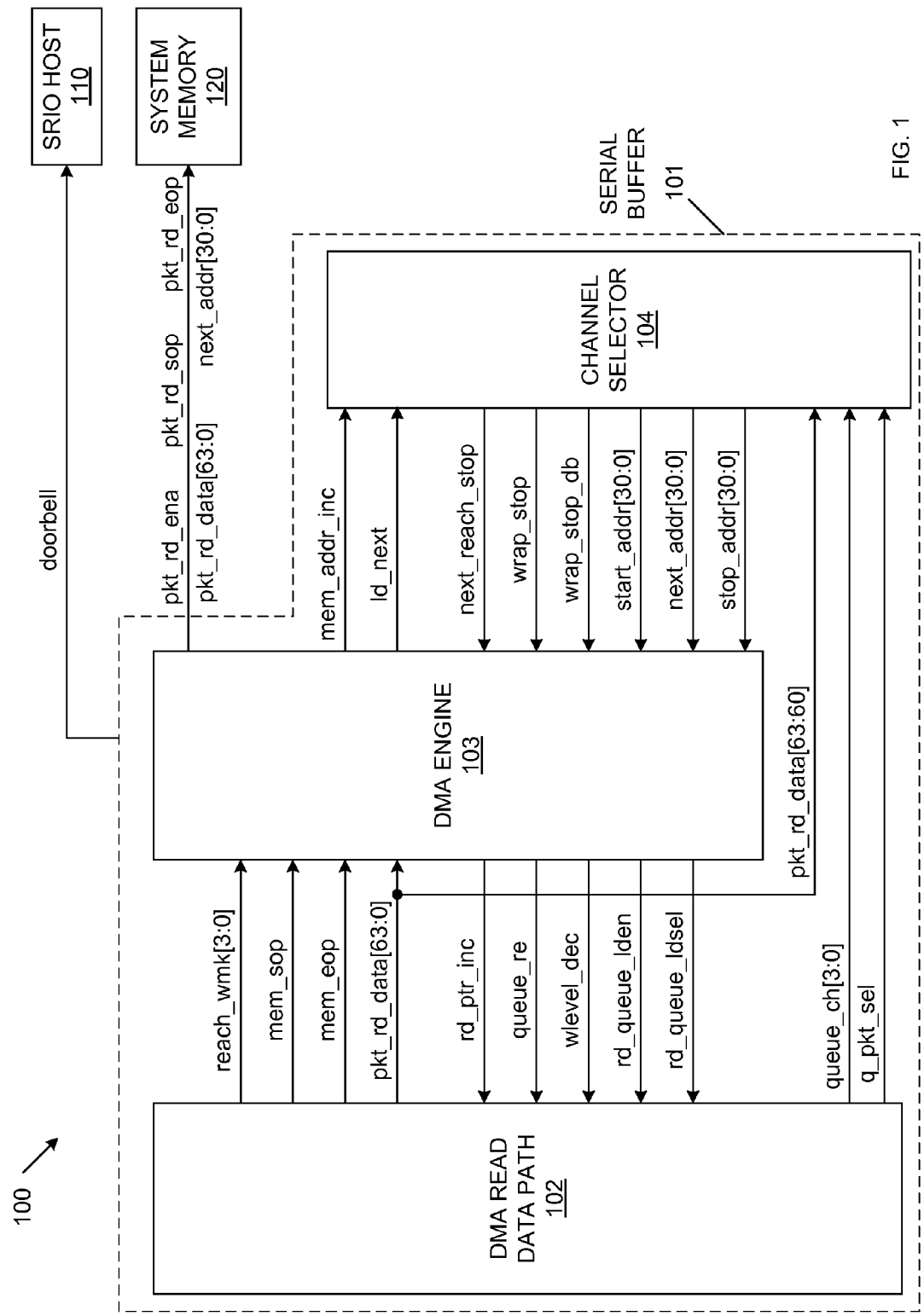
FIG. 1 is a block diagram of a system, which includes a serial buffer that implements DMA to a system memory, in accordance with one embodiment of the present invention.

In accordance with one embodiment of the present invention, a configurable DMA engine is used to control the reading of data packets from selected queues of a serial buffer, and perform bus master DMA operations to transfer the data packets into a serial rapid input/output (sRIO) system memory. The bus master DMA operations are activated when the water level of a queue reaches a watermark associated with the queue. The DMA engine initially fetches a packet header, followed by the packet data.

The DMA engine is configured in response to the contents of a DMA register set. The DMA register set used to configure the DMA engine is selected from a plurality of DMA register sets. Each of the DMA register sets includes a memory start address register, a memory next address register and a memory stop address register. Each memory start address register stores a memory start address, which identifies the first address location of an associated system buffer defined in the sRIO system memory. Each memory stop address register stores a memory stop address, which identifies the last address location of the associated system buffer defined in the sRIO system memory. Each memory next address register stores a next memory address, which identifies an address location within the associated system buffer where the next data value of the DMA transfer will be stored in the sRIO system memory. In general, the next memory address is incremented after each data value is transferred to the associated system buffer.

Prior to starting a DMA operation, one DMA register set is selected and used by the DMA engine. The DMA engine loads the corresponding memory start address into the corresponding memory next address register. Each time the DMA engine causes a data value to be read out of the accessed queue, the DMA engine increments the contents of the memory next address register by one. When the memory next address becomes equal to the memory stop address stored in the memory stop address register, a doorbell is generated and transmitted to an sRIO host processor (assuming that this doorbell is enabled).

In accordance with another embodiment, the DMA engine can be configured to operate in a wrap mode or a stop mode.

If the wrap mode is configured when the memory next address becomes equal to the memory stop address, the DMA engine will reload the memory start address into the memory next address register, and the bus master DMA transfer will continue at the memory start address. The wrap mode allows the configured system memory buffer to be reused, as long as the data previously stored in the buffer can be processed before being overwritten.

If the stop mode is configured when the memory next address becomes equal to the memory stop address, the DMA engine will suspend the bus master DMA transfer. The sRIO host processor will perform the needed operations to process the data stored in the system buffer, and then reprogram the memory next address register to clear the stop condition and resume the bus master DMA transfer.

The DMA register set used to configure the DMA engine can be selected in a queue-based manner or a packet-based manner. If queue-based DMA register set selection is implemented, then each queue will have a corresponding DMA register set, which is specified by a DMA channel number register. If packet-based DMA register set selection is used, then the DMA register set to be used for a particular data transfer is specified in the packet header. Packet-based DMA register set selection effectively allows 'different' DMA engines to be used to transfer each packet, whether these packets are stored in the same queue or different queues. The present invention will now be described in more detail.

FIG. 1 is a block diagram of a system 100, which includes serial buffer 101, sRIO host processor 110, and system memory 120. Serial buffer 101 includes DMA read data path 102, DMA engine 103 and channel selector 104. Serial buffer 101 may include other circuit elements, which are not relevant to the present invention.

In general, system 100 operates as follows. SRIO host processor 110 causes data packets to be written to queues within DMA read data path 102 of serial buffer 101. When these queues reach predetermined levels of fullness, DMA engine 103 initiates DMA operations, which transfer data packets from the queues to system memory 120. DMA engine 103 is configured in response to a selected set of DMA registers located in channel selector 104. Channel selector 104 includes a plurality of DMA register sets. Each of these DMA register sets enables DMA engine 103 to be configured in a different manner, effectively providing a plurality of different DMA engines (or channels). In the described embodiments, each of the DMA register sets defines a corresponding system buffer within system memory 120, and also defines the manner in which this system buffer may be accessed during a DMA transfer.

Figure 2:
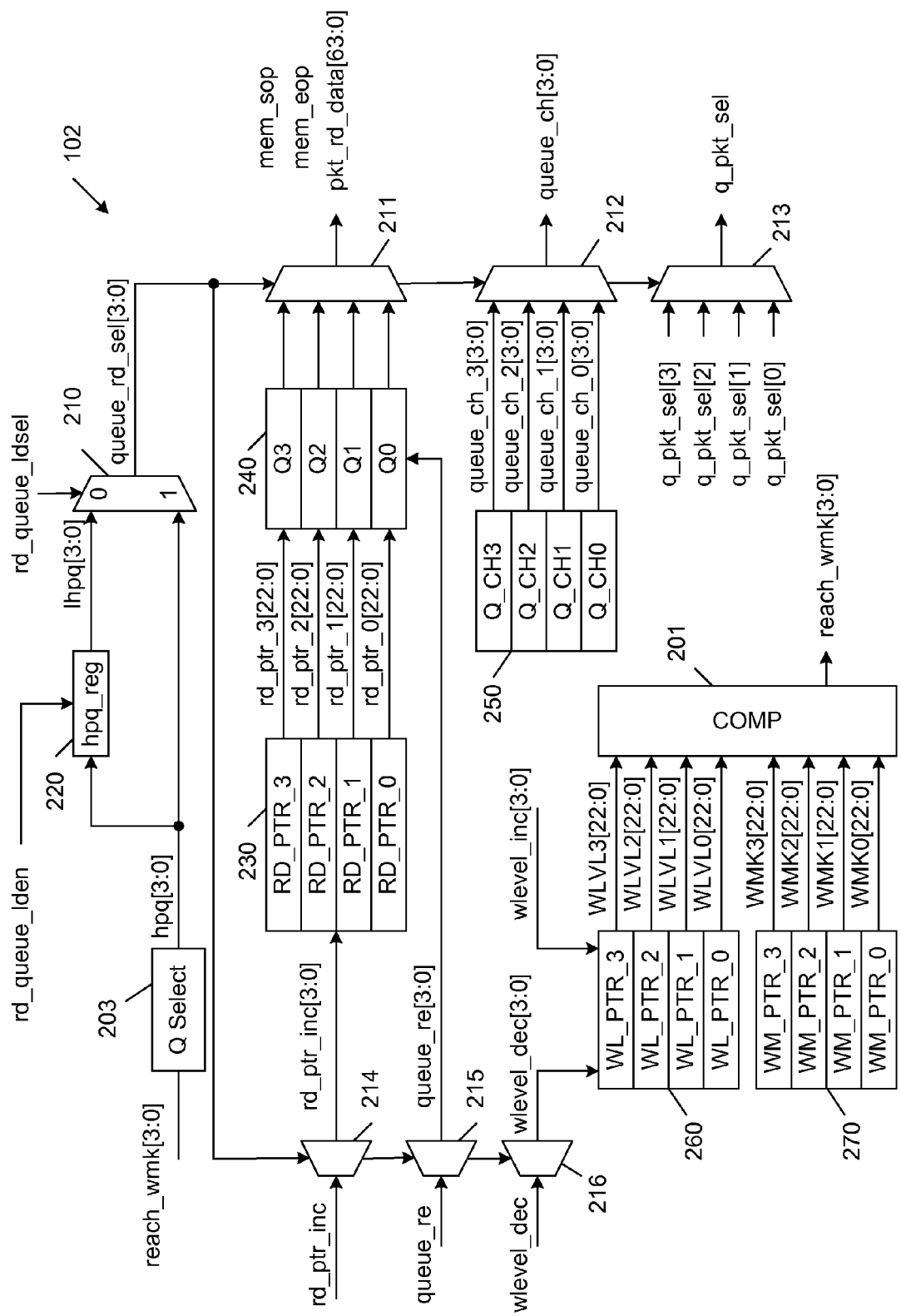
FIG. 2 is a block diagram of DMA read data path of the serial buffer of FIG. 1, in accordance with one embodiment of the present invention.

System 100 will now be described in more detail. FIG. 2 is a block diagram of DMA read data path 102 in accordance with one embodiment of the present invention. DMA read data path 102 includes comparator 201, queue select logic 203, multiplexers 210-213, de-multiplexers 214-216, high-priority queue register 220, read pointer block 230 (which includes read pointers RD_PTR_0, RD_PTR_1, RD_PTR_2 and RD_PTR_3), queue block 240 (which includes queues Q0, Q1, Q2 and Q3), queue channel register block 250 (which includes queue channel select registers Q_CH0, Q_CH1, Q_CH2 and Q_CH3), water level pointer block 260 (which includes water level pointers WL_PTR_0, WL_PTR_1, WL_PTR_2 and WL_PTR_3), and watermark pointer block 270 (which includes watermark pointers WM_PTR_0, WM_PTR_1, WM_PTR_2 and WM_PTR_3).

In general, DMA read data path 102 is used to select one of queues Q0-Q3 for packet data readout operations. To select the queue, the 'water level' of each queue is compared with a corresponding watermark. Each of the queues is assigned a predetermined priority. The selected queue is the highest priority queue having a water level that has reached the corresponding watermark. Hereinafter, the queue selected by DMA read data path 102 is referred to as the 'high-priority active queue'. Only one of queues Q0-Q3 may be designated as the high-priority active queue at any given time.

In general, sRIO host 110 writes data packets into queues Q0-Q3 of queue block 240 on a write data path, which is not shown for reasons of clarity. In the described embodiment, each of queues Q0-Q3 has the capacity to store up to $2^{23}$ data packets.

Watermark pointers WM_PTR_0, WM_PTR_1, WM_PTR_2 and WM_PTR_3 are programmed to store 23-bit watermark values WMK0[22:0], WMK1[22:0], WMK2[22:0] and WMK3[22:0], respectively, which represent predetermined fullness levels of queues Q0, Q1, Q2 and Q3, respectively. The watermark values WMK0[22:0], WMK1[22:0], WMK2[22:0] and WMK3[22:0] are provided to comparator 201.

Water level pointers WL_PTR_0, WL_PTR_1, WL_PTR_2 and WL_PTR_3 are initially reset to store 23-bit water level values WLVL0[22:0], WLVL1[22:0], WLVL2[22:0] and WLVL3[22:0], respectively. Upon being reset, each of these water level pointers store all logic '0' values.

Each time that a data packet is written to one of queues Q0-Q3, the write data path activates a corresponding water level increment signal, which increments the corresponding water level value. That is, each time that a data packet is written to queue Qj, a corresponding water level increment signal wlevel_inc[j] is activated, thereby incrementing the water level value WLVLj[22:0] in water level pointer WL_PTR_j, wherein 'j' has a value of 0, 1, 2 or 3, corresponding with the queue being written.

Each time that a data packet is read from one of queues Q0-Q3, a corresponding water level decrement signal is activated, thereby decrementing the corresponding water level value. That is, each time that a data packet is read from queue Qj, a corresponding water level decrement signal wlevel_dec[j] is activated, thereby decrementing the water level value WLVLj[22:0] stored in water level pointer WL_PTR_j.

In this manner, water level values WLVL0[22:0], WLVL1[22:0], WLVL2[22:0] and WLVL3[22:0] track the actual fullness levels of queues Q0, Q1, Q2 and Q3, respectively. The water level values WLVL0[22:0], WLVL1[22:0], WLVL2[22:0] and WLVL3[22:0] are provided to comparator 201.

Comparator 201 determines when the water level values WLVL0[22:0], WLVL1[22:0], WLVL2[22:0] and WLVL3[22:0] reach the corresponding watermark values WMK0[22:0], WMK1[22:0], WMK2[22:0] and WMK3[22:0], respectively. If comparator 201 determines that a water level value WLVLj[22:0] reaches its corresponding watermark value WMKj[22:0], then comparator 201 activates a corresponding control signal, reach_wmk[j], to indicate this condition. The reach_wmk[3:0] signals are provided to queue select logic 203.

Figure 3:
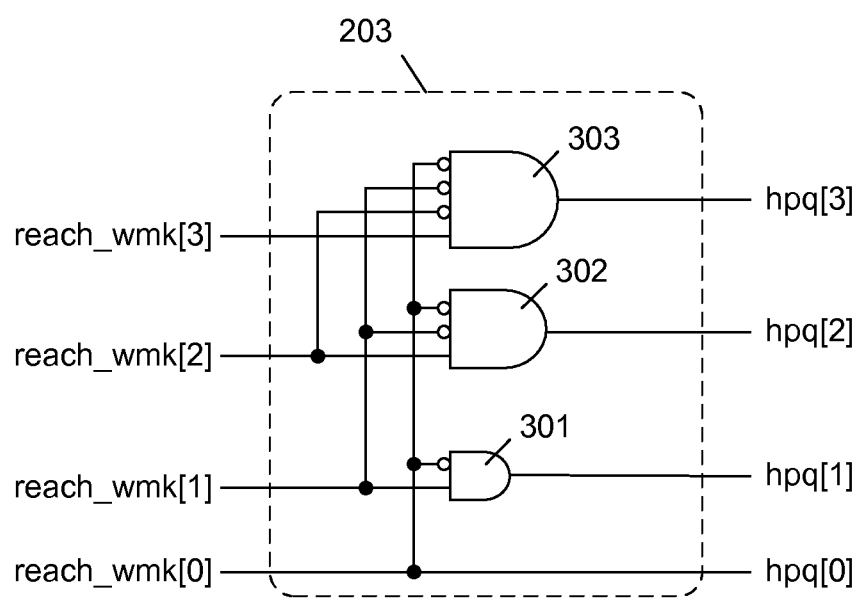
FIG. 3 is a circuit diagram of queue select logic present in the DMA read data path of FIG. 2, in accordance with one embodiment of the present invention.

FIG. 3 is a circuit diagram of queue select logic 203 in accordance with one embodiment of the present invention. In this embodiment, queue Q0 is assigned the highest priority, followed in order of priority by queues Q1, Q2, and Q3 (lowest priority). Queue select logic 203 includes AND gates 301, 302 and 303, which provide high-priority queue indicators hpq[1], hpq[2] and hpq[3], respectively. The reach_wmk[0] signal is routed as high-priority queue indicator hpq[0]. The inverse of the reach_wmk[0] signal is provided to input terminals of AND gates 301-303. Consequently, when the reach_wmk[0] signal is activated to a logic '1' state, the high-priority queue indictors hpq[3:0] will have a value of '0001', thereby indicating that queue Q0 is the high-priority active queue.

In addition to receiving the inverse of the reach_wmk[0] signal, AND gate 301 receives the reach_wmk[1] signal. The inverse of the reach_wmk[1] signal is provided to input terminals of AND gates 302 and 303. Consequently, when the reach_wmk[1] signal is activated to a logic '1' state and the reach_wmk[0] signal is deactivated to a logic '0' state, the high-priority queue indictors hpq[3:0] will have a value of '0010', thereby indicating that queue Q1 is the high-priority active queue.

In addition to receiving the inverses of the reach_wmk[1:0] signals, AND gate 302 receives the reach_wmk[2] signal. The inverse of the reach_wmk[2] signal is provided to an input terminal of AND gate 303. When the reach_wmk[2] signal is activated to a logic '1' state and the reach_wmk[1:0] signals are deactivated to logic '0' states, the high-priority queue indicators hpq[3:0] will have a value of '0100', thereby indicating that queue Q2 is the high-priority active queue.

In addition to receiving the inverses of the reach_wmk[2:0] signals, AND gate 303 receives the reach_wmk[3] signal. Consequently, when the reach_wmk[3] signal is activated to a logic '1' state and the reach_wmk[2:0] signals are deactivated to logic '0' states, the high-priority queue indicators hpq[3:0] will have a value of '1000', thereby indicating that queue Q3 is the high-priority active queue.

If none of the reach_wmk[3:0] signals is activated, then the high-priority queue indicators hpq[3:0] will have a value of '0000', thereby indicating that there is no high-priority active queue.

The high-priority queue indicators hpq[3:0] are provided to high-priority queue register 220 and to the logic '1' input of multiplexer 201. High-priority queue register 220 is initially reset to store a value of '0000'. The high-priority queue indicators hpq[3:0] are latched into high-priority queue register 220 in response to the activated load enable signal, rd_queue_lden. The contents of high-priority queue register 220 are provided to the logic '0' input of multiplexer 210 as the latched high-priority queue indicators lhpq[3:0]. Multiplexer 210 selectively routes the high-priority queue indicators hpq[3:0] or the latched high-priority queue indicators lhpq[3:0] as a read queue select value queue_rd_sel[3:0] in response to the select signal, rd_queue_ldsel. The rd_queue_lden and rd_queue_ldsel signals are generated by DMA engine 103. DMA engine 103 can activate the rd_queue_ldsel signal to a logic '1' state to allow early selection of the high-priority active queue identified by the high-priority queue indicators hpq[3:0]. That is, the high-priority queue indicators hpq[3:0] may be routed as the queue_rd_sel[3:0] value before the rd_queue_lden signal has been activated to latch the high-priority queue indicators hpq[3:0] into register 220.

The queue_rd_sel[3:0] value provided by mulitiplexer 210 is used to control access to the high-priority active queue. The queue_rd_sel[3:0] value is provided to the control terminals of de-multiplexers 214-216. De-multiplexers 214, 215 and 216 are coupled to receive read pointer increment signal (rd_ptr_inc), queue read enable signal (queue_re) and water level decrement signal (wlevel_dec), respectively, from DMA engine 103. The manner in which DMA engine 103 activates these signals is described in more detail below.

When the read pointer increment signal rd_ptr_inc is activated and the queue_rd_sel[3:0] identifies a high-priority active queue Qj (i.e., queue_rd_sel[3:0] is not equal to '0000'), then de-multiplexer 214 provides an activated read pointer increment signal, rd_ptr_inc[j] to read pointer RD_PTR_j. For example, if rd_ptr_inc is activated and queue Q2 is the high-priority active queue (j=2), then de-multiplexer 214 provides an activated read pointer increment signal rd_ptr_inc[2] to read pointer RD_PTR_2 (and de-activated read pointer increment signals rd_ptr_inc[3], rd_ptr_inc[1] and rd_ptr_inc[0] to read pointers RD_PTR_3, RD_PTR_1 and RD_PTR_0, respectively). Each time that the read pointer increment signal rd_ptr_inc[j] is activated, the corresponding read pointer RD_PTR_j is incremented by one. DMA engine 103 activates the rd_ptr_inc signal each time that a data value is read from the high-priority active queue.

Each of the read pointers RD_PTR_0, RD_PTR_1, RD_PTR_2 and RD_PTR_3 provides a 23-bit read pointer value rd_ptr_0[22:0], rd_ptr_1[22:0], rd_ptr_2[22:0] and rd_ptr_3[22:0], respectively, which are used to address queues Q0, Q1, Q2 and Q3, respectively, during DMA read accesses.

When the queue read enable signal queue_re is activated, and the queue_rd_sel[3:0] value identifies a high-priority active queue Qj (i.e., queue_rd_sel[3:0] is not equal to '0000'), then de-multiplexer 215 provides an activated queue read enable signal queue_re[j] to enable read accesses to be performed from the high-priority active queue Qj. For example, if queue_re signal is activated and queue Q2 is the high-priority active queue (j=2), then de-multiplexer 215 provides an activated queue read enable signal queue_re[2] to queue Q2 (and de-activated queue read enable signals queue_re[3], queue_re[1] and queue_re[0] to queues Q3, Q1 and Q0, respectively). DMA engine 103 activates the queue_re signal whenever data is to be read from the high-priority active queue.

When the water level decrement signal wlevel_dec is activated, and the queue_rd_sel[3:0] value identifies a high-priority active queue Qj (i.e., queue_rd_sel[3:0] is not equal to '0000'), then de-multiplexer 216 provides an activated write level decrement signal wlevel_dec[j] to decrement the write level pointer WLVLj[22:0] associated with the high-priority active queue Qj. DMA engine 103 activates the wlevel_dec signal each time that a packet header is read from the high-priority active queue.

The queue_rd_sel[3:0] value is also provided to the control terminals of multiplexers 211-213. Multiplexer 211 is coupled to receive the data read from queues Q0-Q3. In response to the queue_rd_sel[3:0] signal, multiplexer 211 routes the data values read from the high-priority active queue. These data values include a 64-bit packet read data value pkt_rd_data[63:0], a start-of-packet identifier (mem_sop), which identifies the start of a data packet, and an end-of-packet identifier (mem_eop), which identifies the end of a data packet. The pkt_rd_data[63:0], mem_sop and mem_eop signals are provided to DMA engine 103. The first data value read from the high-priority active queue in response to a new queue_rd_sel[3:0] signal is the packet header of the associated packet. This header may include a 4-bit channel select value, pkt_rd_data[63:60], which is used to select one of sixteen DMA register sets in channel selector 104 when a packet-based channel selection is implemented.

Multiplexer 212 is coupled to queue channel select registers Q_CH0, Q_CH1, Q_CH2 and Q_CH3. Queue channel select registers Q_CH0, Q_CH1, Q_CH2 and Q_CH3 are programmed to store queue channel select signals queue_ch_0[3:0], queue_ch_1[3:0], queue_ch_2[3:0] and queue_ch_3[3:0], respectively. Each of these 4-bit queue channel select signals is encoded to select one of sixteen DMA register sets located in channel selector 104 when queue-based channel selection is implemented. Multiplexer 212 routes the queue channel select signal queue_ch_j[3:0] associated with the high-priority active queue Qj in response to the queue_rd_sel[3:0] value. The queue channel select signal queue_ch[3:0] routed by multiplexer 212 is provided to channel selector 104.

Multiplexer 213 is coupled to receive four queue/packet select signals q_pkt_sel[3:0]. Each queue/packet select signal q_pkt_sel[j] determines whether DMA channel selection for the corresponding queue Qj is performed in a queue-based manner or a packet-based manner. That is, each queue/packet select signal q_pkt_sel[j] determines whether channel selector 104 selects a DMA register set for the associated queue Qj in response to the queue channel select signal queue_ch[3:0] (i.e., queue-based channel selection) or in response to the packet channel select value pkt_rd_data[63:60] (i.e., packet-based channel selection). Multiplexer 213 routes the queue/packet select signal q_pkt_sel[j] associated with the high-priority active queue Qj in response to the queue_rd_sel[3:0] signal. The queue/packet select signal q_pkt_sel routed by multiplexer 213 is provided to channel selector 104.

Figure 4:
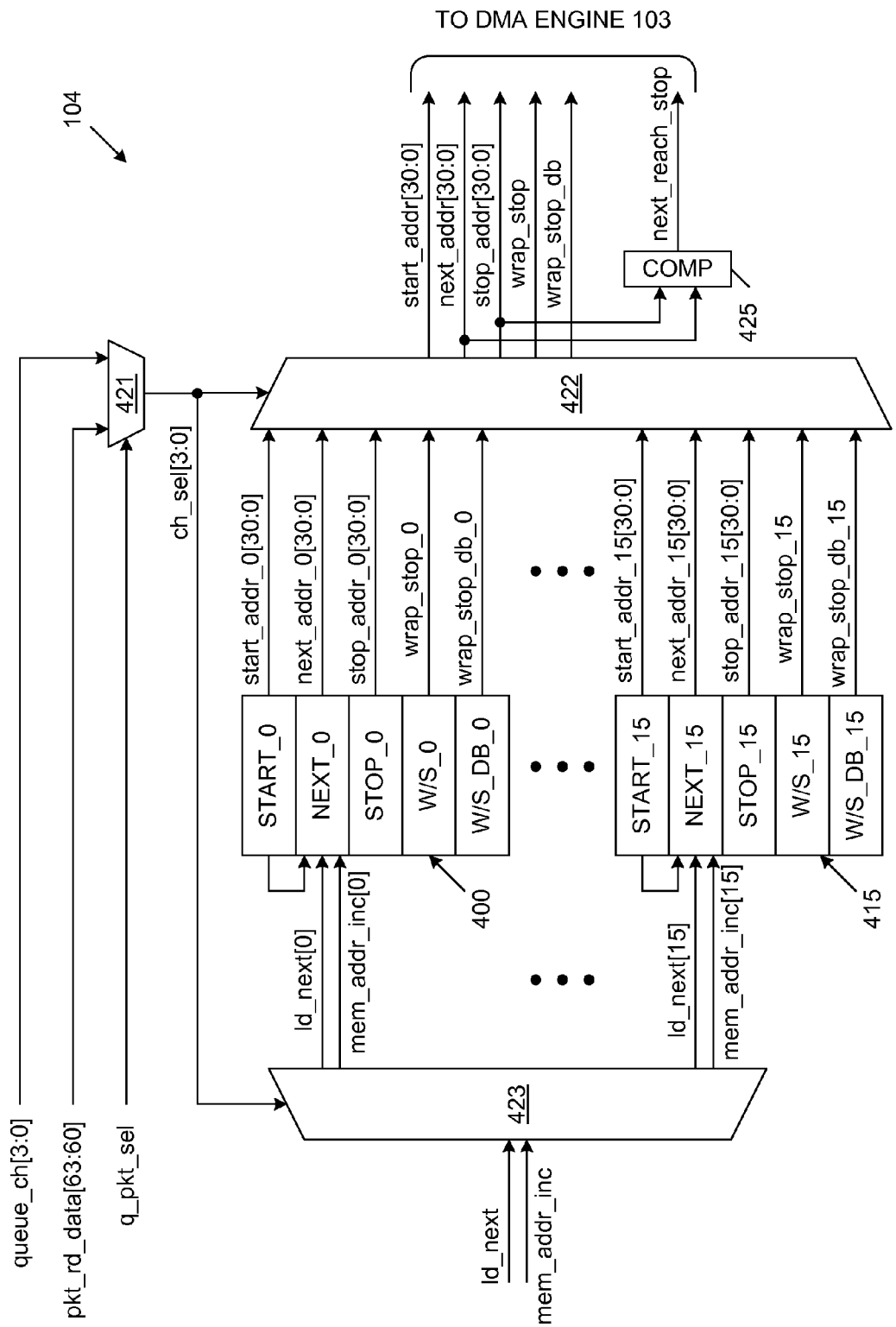
FIG. 4 is a block diagram of a DMA channel selector present in the serial buffer of FIG. 1, in accordance with one embodiment of the present invention.

FIG. 4 is a block diagram of channel selector 104 in accordance with one embodiment of the present invention. Channel selector 104 includes DMA register sets 400-415, multiplexers 421-422, de-multiplexer 423 and comparator 425.

One input of multiplexer 421 is configured to receive the queue-based channel select value queue_ch[3:0] provided by multiplexer 212 (FIG. 2), while the other input of multiplexer 421 is configured to receive the packet-based channel select value pkt_rd_data[63:60] provided by multiplexer 211 (FIG. 2). Multiplexer 421 operates in response to the q_pkt_sel signal provided by multiplexer 213 (FIG. 2). If the q_pkt_sel signal has a logic '1' state, then multiplexer 421 will route the queue_ch[3:0] signal as the DMA channel select value ch_sel [3:0], such that one of the DMA register sets 400-415 will be selected in a queue-based manner. Conversely, if the q_pkt_sel signal has a logic '0' state, then multiplexer 421 will route the pkt_rd_data[63:60] value as the DMA channel select value ch_sel[3:0], such that one of the DMA register sets 400-415 will be selected in a packet-based manner.

The DMA channel select value ch_sel[3:0] is used to control multiplexer 422 and de-multiplexer 423. Multiplexer 422 routes the contents of one of the sixteen DMA register sets 400-415 in response to the value of the channel select signal ch_sel[3:0]. Each of the sixteen DMA register sets 400-415 includes a start address register (START_k), a next address register (NEXT_k), a stop address register (STOP_k), a wrap_stop register (W/S_k), and a wrap_stop_doorbell register (W/S_DB_k), wherein 'k' is equal to a number from 0 to 15.

Each of the start address registers (START_k) stores a corresponding memory start address (start_addr_k[30:0]), which identifies the first address of a corresponding buffer in system memory 120. Similarly, each of the stop address registers (STOP_k) stores a corresponding memory stop address (stop_addr_k[30:0]), which identifies the last address of a corresponding buffer in system memory 120.

Figure 5:
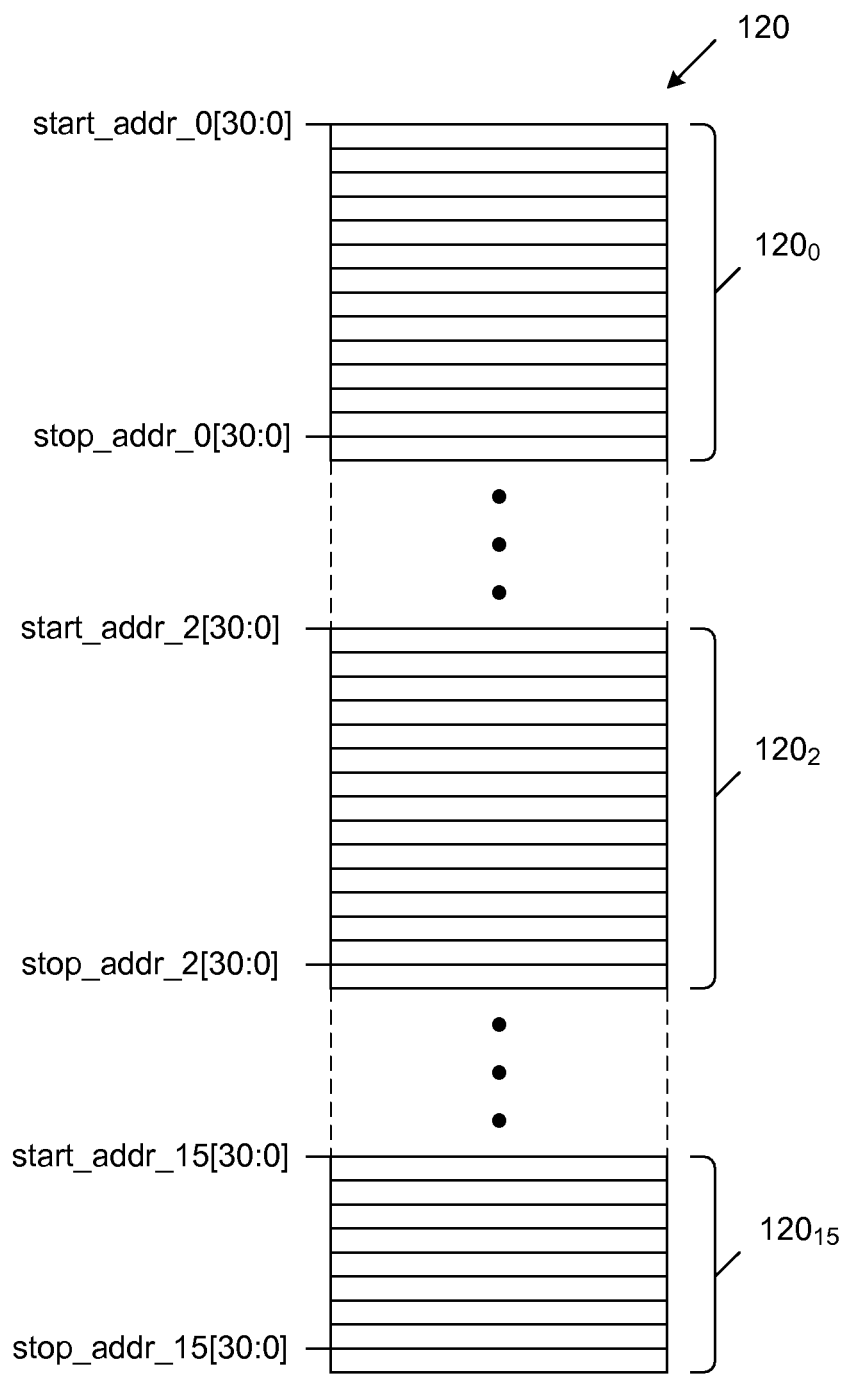
FIG. 5 is a block diagram illustrating system buffers within the system memory of FIG. 1, as defined by DMA register sets of the DMA channel selector of FIG. 4, in accordance with one embodiment of the present invention.

FIG. 5 is a block diagram illustrating system buffers $120_0$, $120_2$ and $120_{15}$, which are located within system memory 120, and are defined by DMA register sets 400, 402 and 415, respectively, in accordance with one embodiment of the present invention. System buffer $120_0$ begins at start_addr_0 [30:0] and ends at stop_addr_0[30:0] within system memory 120. System buffer $120_2$ begins at start_addr_2[30:0] and ends at stop_addr_2[30:0] within system memory 120. System buffer $120_{15}$ begins at start_addr_15[30:0] and ends at stop_addr_15[30:0] within system memory 120. System buffers $120_0$, $120_2$ and $120_{15}$ can have different sizes, based on the desired functionality of the associated DMA transfers. System buffers corresponding with DMA registers 401 and 403-414 are also located in system memory 120, but are not illustrated in FIG. 5 for the sake of clarity. The present invention advantageously allows the system buffers to be allocated in a simple and adjustable manner. That is, the system buffers can be changed by modifying the contents of DMA register sets 400-415.

Returning now to FIG. 4, each of the next address registers (NEXT_k) stores a corresponding memory next address (next_addr_k[30:0]), which identifies the next address to be accessed in a corresponding buffer in system memory 120.

Each of the wrap_stop registers (W/S_k) stores a corresponding wrap_stop identifier (wrap_stop_k), which identifies whether DMA engine 103 will operate in a wrap mode or a stop mode when configured by the associated DMA register set.

Each of the wrap_stop_doorbell registers (W/S_DB_k) stores a corresponding wrap_stop_doorbell identifier (wrap_stop_db_k), which identifies whether DMA engine 103 is enabled to generate doorbell commands when configured by the associated DMA register set.

Multiplexer 422 routes the contents of the selected DMA register set to DMA engine 103 as memory start address start_addr[30:0], memory next address next_addr[30:0], memory stop address stop_addr[30:0], wrap_stop identifier wrap_stop, and wrap_stop doorbell identifier wrap_stop_db.

At the beginning of each new DMA transfer, DMA engine 103 activates a load next control signal (ld_next), which is provided to de-multiplexer 423. De-multiplexer 423 routes the activated ld_next signal to the DMA register set selected by the channel select signal ch_sel[3:0]. More specifically, de-multiplexer 423 routes the activated ld_next signal to the next address register NEXT_k of the selected DMA register set, as the signal ld_next[k]. The activated ld_next[k] signal causes the memory start address start_addr_k[30:0] stored in start address register START_k to be loaded into the next address register NEXT_k. Thus, the memory next address next_addr_k[30:0] is initially set to equal the memory start address start_addr_k[30:0].

DMA engine 103 prepends the memory next address next_addr[30:0] to an sRIO packet header, which is transmitted to system memory 120. The memory next address next_addr [30:0] identifies the address in system memory 120 to which the associated data packet will be transferred.

Each time that a data value is read from the high-priority active queue, DMA engine 103 activates a memory address increment signal (mem_addr_inc), which is provided to de-multiplexer 423. De-multiplexer 423 routes the activated mem_addr_inc signal to the DMA register set selected by the channel select signal ch_sel[3:0]. More specifically, de-multiplexer 423 routes the activated mem_addr_inc signal to the next address register NEXT_k of the selected DMA register set, as the signal mem_addr_inc[k]. The activated mem_addr_inc[k] signal causes the memory next address next_addr_k[30:0] (and thereby next_addr[30:0]) to be incremented by one.

The updated memory next address next_addr[30:0] and the memory stop address stop_addr[30:0] are provided to comparator 425. When the memory next address next_addr[30:0] is incremented to become equal to the memory stop address stop_addr[30:0], comparator 425 activates the control signal, next_reach_stop. The activated next_reach_stop signal indicates that DMA engine 103 is about to transfer data to the last address location in the system buffer defined in system memory 120.

DMA engine 103 receives the next_reach_stop signal provided by comparator 425, and in response, continues processing in response to the state of the wrap_stop signal.

If the wrap_stop signal associated with the selected DMA register set has a logic "1" value, then DMA engine 103 is configured to operate in a wrap mode. Conversely, if the wrap_stop signal associated with the selected DMA register set has a logic "0" value, then DMA engine 103 is configured to operate in a stop mode.

In the wrap mode, the activated next_reach_stop signal causes DMA engine 103 to activate the ld_next signal. As described above, the activated ld_next signal loads the start_addr_k[30:0] into the next address register NEXT_k. Thus, the memory next address next_addr[30:0] is reset to equal the memory start address start_addr[30:0]. As a result, the next_reach_stop signal is deactivated, and the DMA operation continues without stalling. The associated system buffer is effectively re-used for data transfers, using the assumption that the data stored in the system buffer can be processed fast enough to prevent buffer overrun.

In the stop mode, the activated next_reach_stop signal causes DMA engine 103 to stop the DMA transfer. When sufficient data in the system buffer has been processed by sRIO host processor 110, the system software reloads the start address start_addr_k[30:0] into the next address register NEXT_k. At this time, the next_reach_stop signal is deactivated, and the DMA operation may resume. In an alternate embodiment, each DMA register set may define a pair of ping-pong buffers in system memory 120, each having a memory start address and a memory stop address. When the next_reach_stop signal is activated during a transfer to the first ping-pong buffer, the system software programs the second ping-pong buffer with the appropriate start, next and stop addresses to resume the bus master DMA operation. The data received by the first ping-pong buffer is processed in parallel with the transfer to the second ping-pong buffer.

The wrap_stop_db signal determines whether serial buffer 101 provides a doorbell command to sRIO host 110 when the next_reach_stop signal is activated. More specifically, if the wrap_stop_db signal is set to a logic '1' state, then a doorbell command will be generated in response to the activated next_reach_stop signal. Conversely, if the wrap_stop_db signal has a logic '0' state, then a doorbell command will not be generated when in response to the activated next_reach_stop signal.

Figure 6:
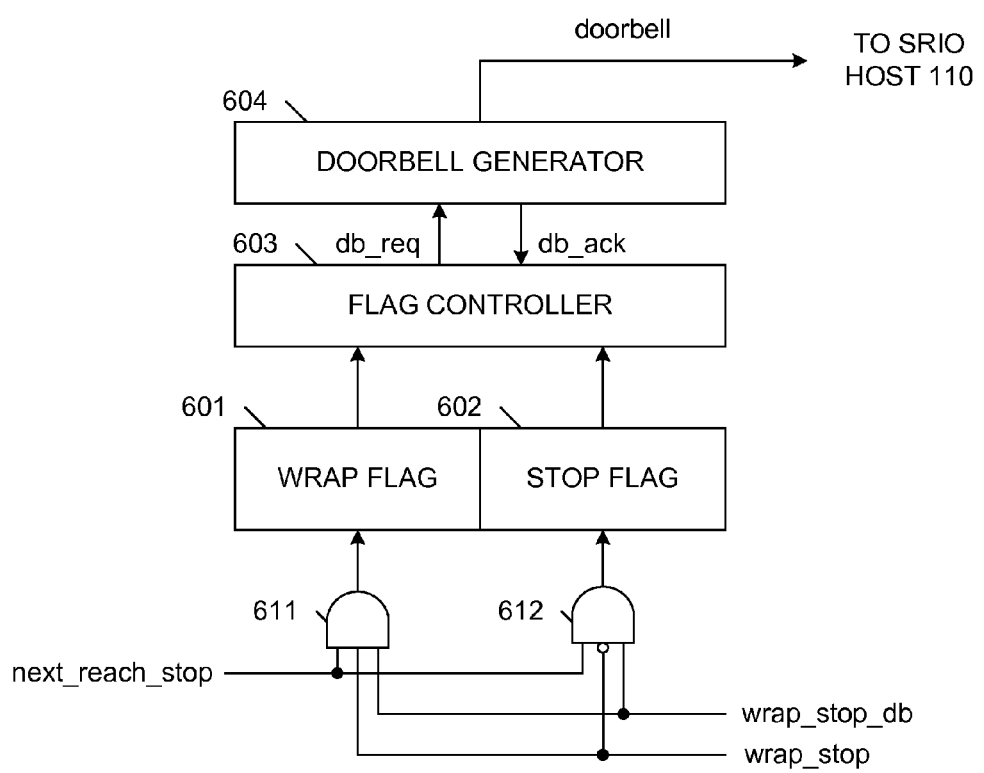
FIG. 6 is a block diagram illustrating a system for generating a doorbell command within the serial buffer of FIG. 1 in accordance with one embodiment of the present invention.

FIG. 6 is a block diagram illustrating a system that may be used to generate the doorbell command. Serial buffer 101 includes a plurality of flag/status registers, including wrap flag register 601 and stop flag register 602. Wrap flag register 601 and stop flag register 602 store a wrap flag and a stop flag, respectively, which are generated by AND gates 611 and 612, respectively. The wrap flag is the logical AND of the next_reach_stop signal, the wrap_stop signal and the wrap_stop_db signal. Thus, the wrap flag is activated to a logic "1" state only if the wrap mode is enabled, the wrap/stop doorbell is enabled, and the memory next address reaches the memory stop address. The stop flag is the logical AND of the next_reach_stop signal, the inverse of the wrap_stop signal and the wrap_stop_db signal. Thus, the stop flag is activated to a logic "1" state only if the stop mode is enabled, the wrap/stop doorbell is enabled, and the memory next address reaches the memory stop address.

Flag controller 603 monitors the contents of wrap flag register 601 and stop flag register 602. Upon detecting that either the wrap flag or the stop flag is activated, flag controller 603 activates a doorbell request signal, db_req, which is provided to doorbell generator 604. In response, doorbell generator 604 transmits a doorbell request, which is transmitted to sRIO host processor 110. Doorbell generator 604 also activates a doorbell acknowledge signal db_ack, which is returned to flag controller 603, thereby indicating that the doorbell command has been transmitted.

In an alternate embodiment, the wrap_stop_db signal is not applied to AND gates 611 and 612, but is instead stored in a mask register associated with registers 601 and 602. The wrap and stop flags are generated with AND gates 611 and 612 in response to the next_reach_stop and wrap_stop signals. Flag controller 603 logs activated wrap flags and stop flags, and then checks the value of the wrap_stop_db signal stored in the mask register. If the wrap_stop_db signal stored in the mask register has an active state, flag controller 603 causes the doorbell to be generated. However, if the wrap_stop_db signal stored in the mask register has an inactive state, flag controller 603 does not generate a doorbell. The manner in which doorbell commands are generated in response to the contents of flag registers is described in more detail in commonly owned, co-filed U.S. patent application Ser. No. 11/679,823, which is hereby incorporated by reference in its entirety.

SRIO host processor 110 processes the doorbell commands in the following manner. Upon receiving a doorbell request, the system software will enter a doorbell handler routine to service the pending doorbell request.

If the stop mode is configured, data in the system buffer is moved into a user buffer (final destination). The system software then reprograms the next address register of the selected DMA register set to store the start address of the selected DMA register set, thereby de-activating the next_reach_stop signal and resetting the stop flag. In an alternate embodiment, the DMA register set implement a set of ping-pong buffers, as described above. The DMA transfer will resume the next time that the associated water level reaches the associated watermark.

If the wrap mode is configured, the doorbell command informs the system software that the DMA operation has reached the stop address, and wrap around has already occurred.

Figure 7:
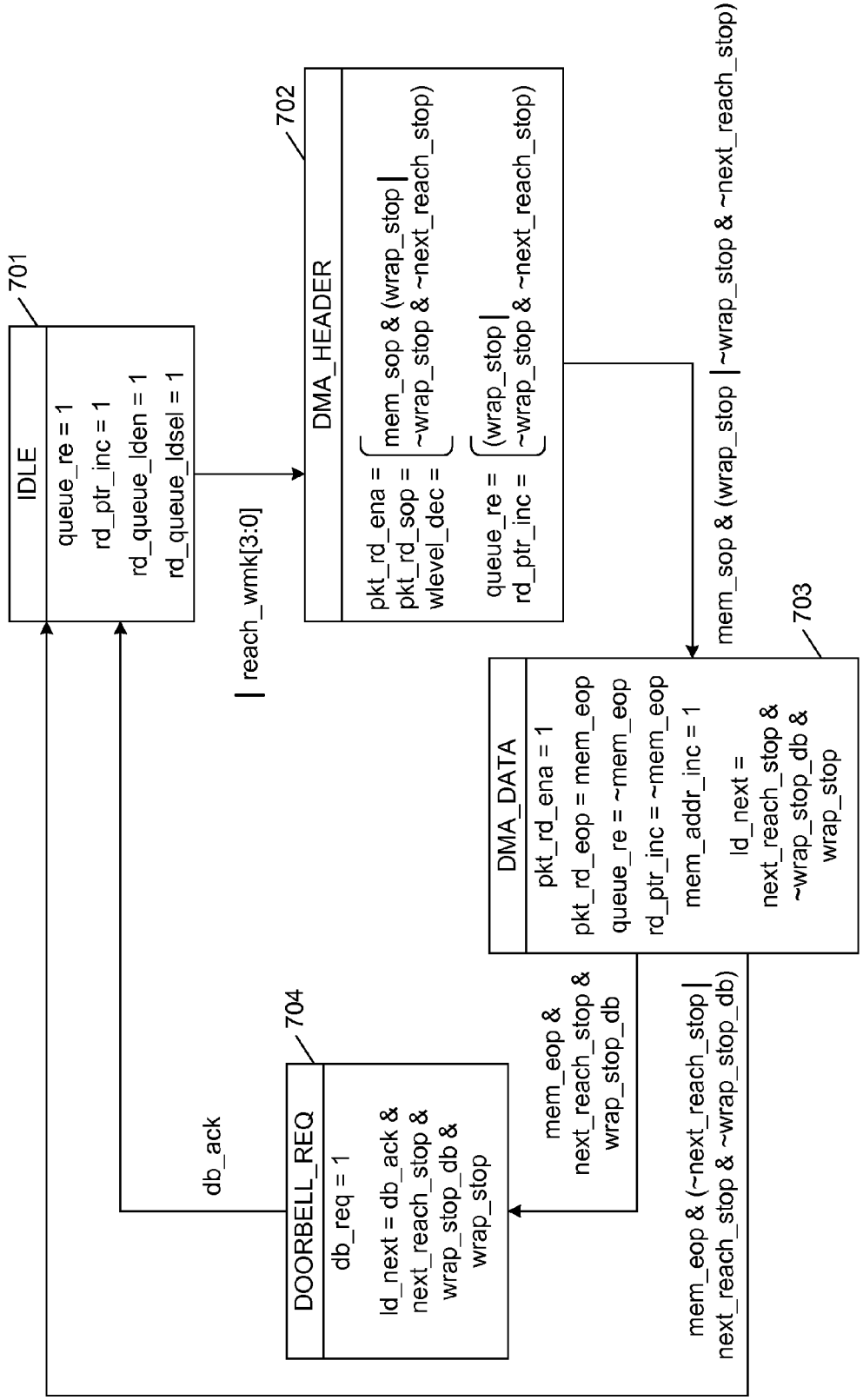
FIG. 7 is a flow diagram illustrating a DMA read control flow in accordance with one embodiment of the present invention.

FIG. 7 is a flow diagram illustrating the DMA read control flow in more detail, in accordance with one embodiment of the present invention. If none of the water levels of queues Q0-Q3 have reached the associated watermarks (i.e., reach_wmk[3:0] has a logic value of '0000'), then the DMA read control flow is in IDLE state 701. While in IDLE state 701, if any of the reach watermark indicators reach_wmk[3:0] are activated, then DMA engine 103 asserts the queue read enable signal queue_re to enable data to be read from the high-priority active queue. DMA engine 103 also activates the rd_ptr_inc signal, thereby causing the read pointer associated with the high-priority active queue to be incremented by one, such that this read pointer points to the next entry of the high-priority active queue. In addition, DMA engine 103 activates the rd_queue_lden signal to latch the high-priority queue indicators hpq[3:0]. DMA engine 103 also controls the rd_queue_ldsel signal to allow early queue selection while in the IDLE state 701. Processing then proceeds to DMA_HEADER state 702.

While in the DMA_HEADER state 702, a packet header is read from the high-priority active queue identified by the reach_wmk[3:0] signals. If this packet header includes an activated memory start of packet indicator (i.e., mem_sop=1), and the wrap mode is configured (i.e., wrap_stop=1), or the stop mode is configured (i.e., wrap_stop=0) and the next_reach_stop signal is not active, then DMA engine 103 will provide a DMA header to system memory 120. Under these conditions, DMA engine 103 activates the queue read enable signal queue_re and the rd_ptr_inc signal, to start pre-fetching packet data from the high-priority active queue. DMA engine 103 also asserts the wlevel_dec signal to decrement the waterlevel associated with the high-priority active queue by one as the stored packet data is being read. In addition, DMA engine 103 asserts the pkt_rd_ena signal (to provide a valid packet indication) and the pkt_rd_sop signal (for packet header indication), which make up a portion of the DMA header. Processing then proceeds to DMA_DATA state 703.

Note that if the stop mode is configured (i.e., wrap_stop=0), then processing proceeds to the DMA_DATA state 703 only if the next_reach_stop signal is not active. If the stop mode is configured, and the next_reach_stop signal is active, then processing will remain in the DMA_HEADER state 702 until the next_reach_stop signal has been reset.

While in DMA_DATA state 703, DMA data will be read out until an activated end-of-packet indictor is detected in the data read from the high-priority active queue (i.e., mem_eop=1). DMA engine 103 activates the queue_re and rd_ptr_inc signals each time that a packet data value is read, thereby incrementing the read pointer of the high-priority active queue and causing the next packet data value to be read from the high-priority active queue. DMA engine 103 continues to activate the pkt_rd_ena signal to indicate to system memory 120 that a valid packet is being transferred. DMA engine 103 also activates the mem_addr_inc signal to increment the next_addr[30:0] value each time that a packet data value is read. DMA engine 103 also activates the ld_next signal if the next_reach_stop signal is activated, the wrap_stop doorbell is disabled, and the wrap mode is configured. In this case, the activated ld_next signal reloads the start address start_addr[30:0] into the corresponding next address register to perform the buffer wrap around operation described above, thereby allowing DMA engine 103 to continue the DMA transfer.

When the activated end-of-packet indictor is detected in the data read from the high-priority active queue, DMA engine 103 activates the pkt_rd_eop signal, which is provided to system memory 120 to indicate that the DMA transfer is complete. In addition, DMA engine 103 de-activates the queue_re and rd_ptr_inc signals, thereby preventing further data packet values from being read from the high-priority active queue, and preventing the read pointer of the high-priority active queue from being incremented.

If the next_reach_stop signal is not activated when the mem_eop signal is activated, then processing returns to IDLE state 701. Processing also returns to IDLE state 701 if the next_reach_stop signal is activated and the wrap_stop_db signal is disabled when the mem_eop signal is activated.

However, if the next_reach_stop signal and the wrap_stop_db signal are both activated when the mem_eop signal is activated, then processing proceeds to DOORBELL_REQ state 704. In this state, doorbell generation is requested by asserting the doorbell request signal db_req (See, FIG. 6). Upon receiving an activated doorbell acknowledge signal db_ack, the ld_next signal is activated if the wrap mode is configured. The activated ld_next signal reloads the start address start_addr[30:0] into the corresponding next address register to perform the buffer wrap around operation described above. Processing then returns to IDLE state 701.

In the foregoing manner, the present invention allows DMA engine 103 to be operated in an efficient manner in response to a plurality of DMA register sets 400-415.

Although the present invention has been described in connection with several embodiments, it is understood that this invention is not limited to the embodiments disclosed, but is capable of various modifications which would be apparent to one of ordinary skill in the art. Thus, the invention is limited only by the following claims.

We claim:

1. A serial buffer comprising:
    a plurality of queues configured to store data packets received from a host;
    a direct memory access (DMA) engine coupled to receive data packets read from the queues;
    a plurality of DMA register sets, wherein each of the DMA register sets is configured to store parameters that define a corresponding DMA channel of the DMA engine, and wherein each of the DMA register sets include a start address register configured to store a start address and a stop address register configured to store a stop address, wherein the start address and the stop address define a unique buffer within a system memory, and wherein each of the DMA register sets include a wrap/stop register configured to store a wrap_stop identifier that indicates whether or not the buffer is accessed in a wrap-around manner; and
    circuitry for selecting one of the DMA register sets to configure the DMA engine, thereby enabling the DMA engine to transfer the received data packets to the system memory using the corresponding DMA channel.

2. The serial buffer of claim 1, wherein each of the DMA register sets include a next address register configured to load the start address from the start address register.

3. The serial buffer of claim 2, further comprising means for incrementing the next address register of the selected one of the DMA register sets when the DMA engine implements a transfer to the system memory.

4. The serial buffer of claim 3, wherein the DMA engine is configured to access the system memory in response to the contents of the next address register of the selected one of the DMA register sets.

5. The serial buffer of claim 2, further comprising a comparator having inputs coupled to the stop address register and the next address register of the selected one of the DMA register sets.

6. A serial buffer comprising:
    a plurality of queues configured to store data packets received from a host;
    a direct memory access (DMA) engine coupled to receive data packets read from the queues; and a plurality of DMA register sets, wherein each of the DMA register sets is configured to store parameters that define a corresponding DMA channel of the DMA engine, and wherein each of the DMA register sets include a start address register configured to store a start address and a stop address register configured to store a stop address, wherein the start address and the stop address define a unique buffer within a system memory, and wherein each of the DMA register sets include a wrap/stop doorbell register configured to store a wrap stop doorbell enable signal that indicates whether or not the serial buffer transmits a doorbell to the host when the DMA engine implements a transfer to an associated stop address; and circuitry for selecting one of the DMA register sets to configure the DMA engine, thereby enabling the DMA engine to transfer the received data packets to the system memory using the corresponding DMA channel.

7. The serial buffer of claim 1, wherein the circuitry for selecting one of the DMA register sets operates in response to which of the queues provides the data packets to the DMA engine.

8. The serial buffer of claim 7, wherein the circuitry for selecting one of the DMA register sets operates in response to information included in the data packets received by the DMA engine.

9. The serial buffer of claim 1, wherein the circuitry for selecting one of the DMA register sets operates in response to information included in the data packets received by the DMA engine.

10. The serial buffer of claim 1, further comprising:
a plurality of water level indicators, each associated with a corresponding one of the queues;
a plurality of watermark indicators, each associated with a corresponding one of the queues; and
a comparator coupled to receive the water level indicators and the watermark indicators, and in response, activate a control signal when a water level indicator associated with a queue reaches a watermark indicator associated with the queue.

11. The serial buffer of claim 10, wherein each of the queues has an assigned priority, further comprising logic for identifying a highest priority queue having an associated water level indicator that has reached the associated watermark indicator.

12. The serial buffer of claim 1, further comprising a plurality of queue channel select registers, each associated with a corresponding one of the queues, and each configured to store a channel select value that defines a DMA register set associated with the corresponding one of the queues.

13. A serial buffer comprising:
a queue configured to store data packets received from a host, wherein the queue has a queue channel select value and a queue/packet select value;
a direct memory access (DMA) engine coupled to receive data packets read from the queue;
a plurality of DMA register sets, each storing parameters that define a corresponding DMA channel of the DMA engine; and
means for selecting one of the DMA register sets to configure the DMA engine, wherein the means for selecting selects one of the DMA register sets in response to the queue channel select value when the queue/packet select value has a first value, and wherein the means for selecting selects one of the DMA register sets in response to a packet channel select value included in each of the data packets read from the queue when the queue/packet select value has a second value.

14. A serial buffer comprising:
a plurality of queues configured to store data packets received from a host, each of the queues having a corresponding queue channel select value and a corresponding queue/packet select value;
a direct memory access (DMA) engine coupled to receive data packets read from the queues;
a plurality of DMA register sets, each storing parameters that define a corresponding DMA channel of the DMA engine; and
means for selecting one of the DMA register sets to configure the DMA engine, wherein the means for selecting selects one of the DMA register sets in response to the queue channel select value corresponding with a queue being read when the queue/packet select value has a first value, and wherein the means for selecting selects one of the DMA register sets in response to a packet channel select value included in a data packet retrieved from the queue being read when the queue/packet select value has a second value.

* * * * *